United States Patent [19]

Hornung

[11] Patent Number: 4,618,805
[45] Date of Patent: Oct. 21, 1986

[54] DEVICE FOR REGULATING ROTARY SPEED OF AN ALTERNATING CURRENT ELECTRIC MOTOR

[75] Inventor: Friedrich Hornung, Stuttgart, Fed. Rep. of Germany

[73] Assignee: Robert Bosch GmbH, Stuttgart, Fed. Rep. of Germany

[21] Appl. No.: 734,385

[22] Filed: May 14, 1985

[30] Foreign Application Priority Data

Jun. 16, 1984 [DE] Fed. Rep. of Germany ....... 3422458

[51] Int. Cl.$^4$ .............................................. H02P 7/36
[52] U.S. Cl. .................................... 318/245; 318/301; 318/432
[58] Field of Search ............... 318/245, 663, 674, 125, 318/132, 293, 294, 301, 339, 432

[56] References Cited

U.S. PATENT DOCUMENTS 4,112,343  9/1978  Douglas ............................. 318/674
4,200,829  4/1980  Pohl .................................... 318/782
4,228,383  10/1980  Soeda et al. ........................ 318/245

FOREIGN PATENT DOCUMENTS 2017033  10/1970  Fed. Rep. of Germany ...... 318/674

Primary Examiner—William M. Shoop, Jr.
Assistant Examiner—Bentsu Ro
Attorney, Agent, or Firm—Michael J. Striker

[57] ABSTRACT

A device for independently regulating rotary speed and torque of an alternating current electric motor whose armature winding is connected as a branch of a bridge circuit balanced for a fixed rotary speed and a fixed operational voltage of the motor. The motor is controlled by a current phase adjuster having an input electrode. A polarity dependent resistive circuit including two anti-parallel diodes each connected in series with an adjustable resistor, forms a branch of the bridge circuit. A comparator in the form of an operational amplifier has its inputs connected to a diagonal of the bridge circuit and its output connected to the control input of the current adjuster. The rotary speed and torque are controlled independently by adjusting the resistors in the polarity dependent resistive means.

13 Claims, 5 Drawing Figures

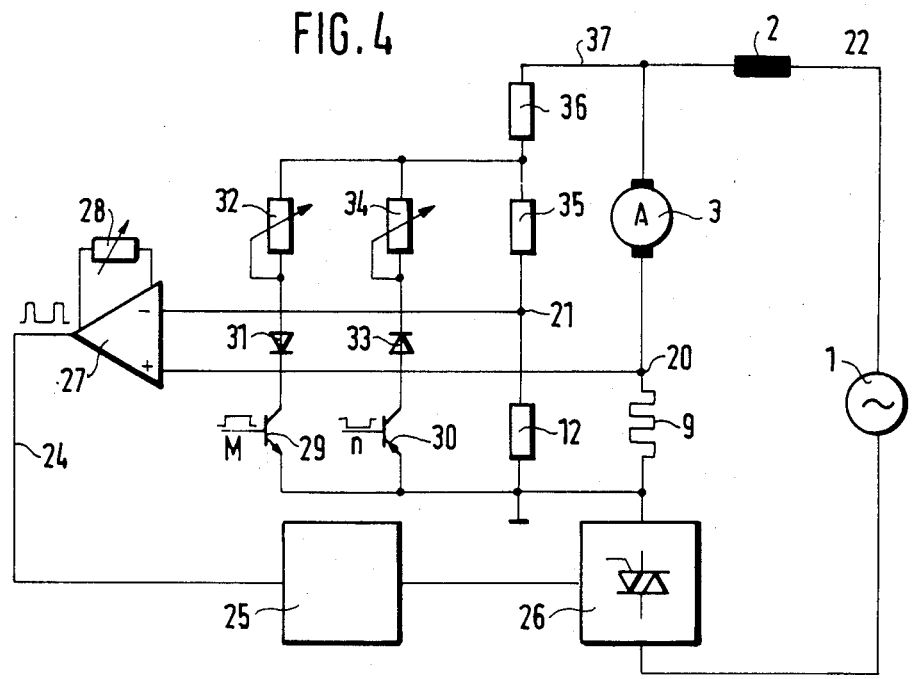
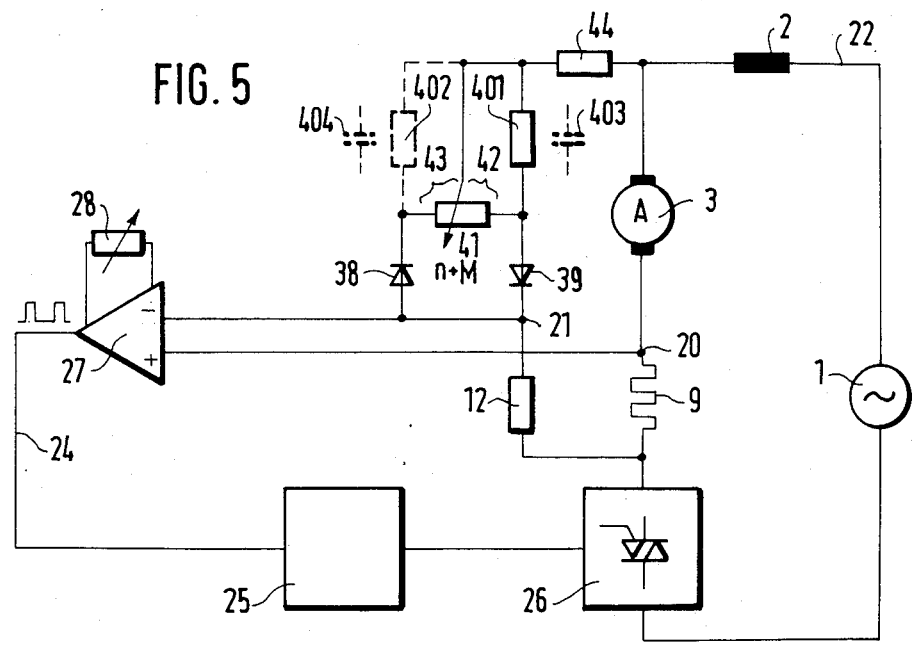

DEVICE FOR REGULATING ROTARY SPEED OF AN ALTERNATING CURRENT ELECTRIC MOTOR

BACKGROUND OF THE INVENTION

The present invention relates to a device for regulating rotary speed of an alternating current motor having an armature coil connected as a branch of a bridge circuit balanced for a fixed rotary speed and a fixed operational voltage of the motor, and the device further including an adjuster controlled by voltage across a diagonal of the bridge circuit to adjust current flowing through the armature coil.

In an electronic regulation of a universal motor an internal electrical regulating signal is derived from the torque which in turn is derived from the rotary speed or from the current of the motor. The regulating magnitude controls motor voltage or current via an excitation circuit and a power semiconductor. The manner in which the internal regulating magnitude depends on the rotary speed or on torque as well as how the former is processed and manipulated by the excitation circuit determines the behavior of the electric motor in its working range or working point of its characteristic line. From the German publication DE-AS No. 23 12 127, for example, an electric rotary speed regulator is known in which the regulating magnitude is generated by a bridge circuit. The armature coil of the motor and a current measuring resistor is arranged in one branch of the bridge whereas in another of the latter two reference resistors are arranged. The bridge is designed such to as to be balanced at a fixed, average torque of the motor. In the case of loading the motor above this average torque or unloading below the latter the bridge becomes unbalanced. By suitably dimensioning the bridge circuit a fixed course of characteristic lines can be obtained. This prior art arrangement however does not enable to adjust the characteristic lines of individual parameters of the motor.

SUMMARY OF THE INVENTION

It is therefore a general object of the present invention to overcome the above-mentioned disadvantage.

In particular it is an object of the invention to provide a regulating device of the before described kind in which the individual characteristic lines are individually adjustable. For example the rotary speed of the motor and the maximum torque thereof can be adjusted independently one from the other.

In keeping with this object and with others which will become apparent hereafter, one feature of the invention resides, in a device for regulating rotary speed of an alternating current electric motor by means of a bridge circuit which includes in a branch thereof an armature winding of the motor whereby the bridge is balanced for a fixed rotary speed and a fixed operational voltage of the motor, in a combination which comprises a current adjuster controlled by a voltage generated across a diagonal of the bridge circuit so as to adjust current flowing through the armature winding, and polarity dependent resistive means arranged in another branch of the bridge circuit. In the preferred embodiment, the polarity dependent resistive means include adjustable resistors whose setting make it possible that the rotary speed or a maximum torque can be adjusted independently from the outside. For example, the operator of a driving machine can individually adjust both the rotary speed and the maximum torque. In a simple embodiment of the regulating device of this invention, the polarity dependent resistive means includes an anti-parallel connection of diodes each connected in series with an adjustable resistor and forming together the other branch of the bridge circuit. The current control includes a switching comparator or a switch regulator, for example a reverse logarithmic operational amplifier connected between the diagonal terminals of the bridge circuit. The switching or cut off level of the control is adjustable so that only the peaks of amplitudes of the rectified voltage from the other branch of the bridge circuit are employed for the current regulation. In this manner, the regulating device is rendered unsensitive to interferences. Another advantage of the device of the invention is to be seen in the fact that the pulse with modulated regulating signal at the output of the comparator can be easily converted either into an analog control signal or into a digital control signal. As mentioned before, the switching or cut off level of the comparator or operational amplifier is variable. In this manner, it is achieved that the regulating signal can be superbly matched to the subsequent current control element in the case of a digital design, the resulting regulating signal can be easily processed by a microprocessor. The device of this invention is suitable for use with AC electric motors of different types which by changing the cut off or threshold switching value of the comparator, can be readily operated without the need of circuit modifications in the device.

In a further elaboration of this invention it is of advantage when the polarity dependent resistive means are arranged in a secondary branch leading a partial bridge current instead of being directly connected in a primary branch of the bridge circuit. In this manner the operational reliability is increased by relating the adjustable polarity dependent resistors to a fixed point on the mass. In addition, this modification enables the control by means of other circuit elements than by the polarity dependent potentiometers. For example, the adjustment of the rotary speed and of the torque of the motor can be effected via additional switches or sensors which can be used for the remote control. For example the control is not dependent on the kind of drill bit chucked in the machine. In order to increase working voltage for the current adjuster it is advantageous when a partial current is tapped off from the bridge circuit via an auxiliary resistor. In this manner, even in a balanced condition of the bridge a sufficient control voltage is available for controlling transistor networks in the adjuster.

In still another embodiment it is advantageous when the polarity dependent resistive means include anti-parallel diodes interconnected by a potentiometer whose arm is connected to the bridge. This measure makes it possible to provide a combined rotary speed and torque regulation by a single control element. In other words, it is achieved that by reducing the rotary speed the maximum torque is also more or less reduced or when suitably dimensioning the values of the component parts the torque can remain constant. This dimensioning of circuit components can be made for example by connecting additional resistors parallel to the tapped parts of the potentiometer. Preferably, the additional dimensioning resistors are bridged by capacitors. In this way, if desired, the start of the motor can be either delayed or accelerated and a soft start or a very fast start is achievable.

The novel features which are considered characteristic for the invention are set forth in particular in the appended claims. The invention itself however both as to its construction and its method of operation, together with additional objects and advantages thereof, will be best understood from the following description of specific embodiments when read in connection with the accompanying drawing.

BRIEF DESCRIPTION OF THE DRAWING

FIG. 4 is another embodiment of the device of this invention; and

FIG. 5 is still another embodiment of the device of this invention.

BRIEF DESCRIPTION OF THE PREFERRED EMBODIMENTS

Figure 1:
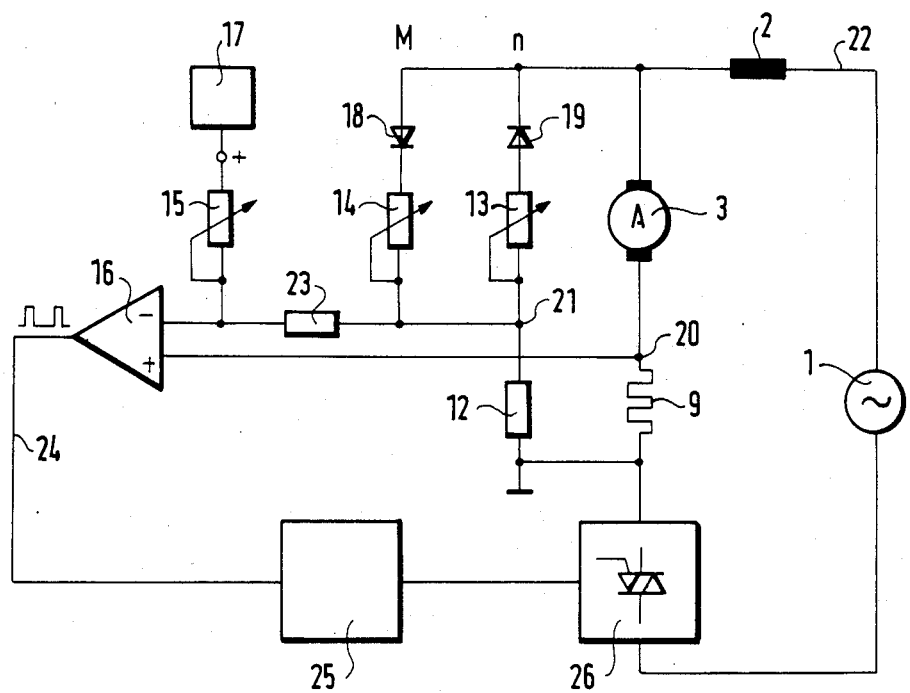
FIG. 1 is a schematic circuit diagram of a first embodiment of the device of this invention.

FIG. 1 illustrates a field winding 2 of an AC electric motor which is connected via a conduit 22 to a source of alternating current voltage 1. Field winding 2 is connected in series with armature winding 3 and a current measuring resistor 9 to ground. The armature winding 3 forms a branch of a bridge circuit whose other branch is formed by the measuring resistor 9. The remaining two branches are formed by another resistor 12 and a polarity dependent anti-parallel connection of diodes 18, 19 and adjustable resistors 13 and 14, as it will be explained below. One diagonal of the bridge circuit is provided with connection point 20 between the armature winding 3 and the measuring resistor 9 and another connection point 21 between the resistor 12 and the polarity dependent branch.

Diode 18 is connected in forward direction between the field winding 2 and via the adjustable resistor 14 to the connection point 21. The other diode is connected in reverse direction between the field winding 2 and via the adjustable resistor 13 to the bridge point 21. A switching comparator 16 in the form of an operational amplifier has its noninverting input (+) connected to the bridge point and its inverting input (−) connecting via a resistor 23 to the bridge point 21. A source of reference voltage 17 is connected via an adjustable resistor 15 to the inverting input of comparator 16. By changing the value of the resistor 15 the threshold level of the comparator is adjusted. The output of the switching comparator 16 is connected via a conductor 24 to a control member 25 which can be in the form of a converter or a demodulator. The output of the control member 25 is connected to a control input of a current controlling element 26 connected between ground and the source of alternating current voltage 1. The control element 26 can be either a thyristor (SCR) or a triac.

The operation of the regulating device of FIG. 1 will be explained in connection with FIGS. 2 and 3. For the proper functioning of this invention it is essential that the comparator 16 is a regulating amplifier which has no proportional amplifying or transfer behavior but operates exclusively in a switching mode. By the action of the comparator 16 the bridge voltage between the points 20 and 21 is converted into a pulse width modulated regulating signal.

Figure 2:
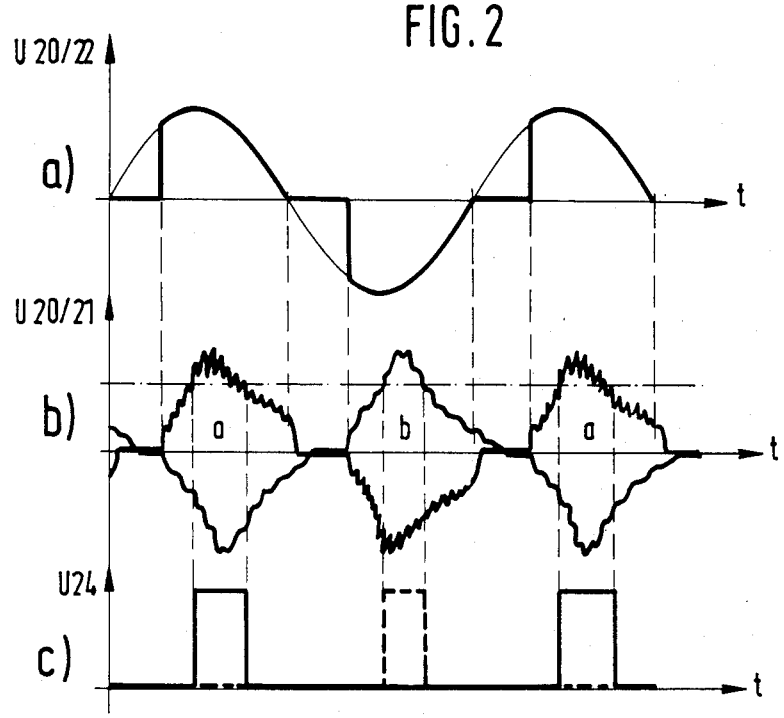
FIG. 2 is a plot diagram depicting the operation of the device of FIG. 1.

Time plot diagram a in FIG. 2 illustrates the sinusoidal voltage between the points 20 and 22 of the electric motor. Bold lines illustrate a typical course of an electric current flowing through the motor which in this example corresponds to angle of 120°. During the switched-on phase of the control element 26 a voltage is generated across the diagonal of the bridge circuit (points 20 and 21) whose course is illustrated in the time plot b of FIG. 2. For the regulating device of this invention only the peaks of the voltage amplitudes between the points 20 and 21 are employed because only the highest portion of the bridge voltage changes unambiguously with loading or unloading the electric motor. The lower portions of the voltage have no use for the regulation. In order to suppress these lower parts of the bridge voltage, the comparator is provided with a conventional threshold level $U_{20/21}$ which is indicated in FIG. 2b by a dash and dot line. The output pulses $U_{24}$ at the output of the comparator 16 are illustrated in the time plot 2c. It will be seen that the width of the output pulses corresponds to the width of the voltage peaks which exceed the cut off or threshold level $U_{20/21}$. If the height of the voltage amplitudes changes due to a rise or drop of the bridge voltage, then these changes are reflected by the corresponding changes in width of the pulses $U_{24}$.

The pulse width modulated regulating signal is substantially less sensitive to saturation distortions and distortions caused by fouling the commutator of the motor, than regulating signals produced by a proportional amplification of the bridge voltage. In addition, the temperature changes of the motor have a reduced effect. In order to match the device of this invention to different operational conditions the cut off level of the comparator is variable and is derived from a current which is determined by the source of reference voltage 17 and a voltage divider formed by the series connection of resistors 15, 23 and 12. The voltage drop across resistors 23 and 12 thus represents the cut off or threshold level of the comparator 16. In changing the switching threshold level the signal from the comparator 16 is matched to the bridge circuit, namely to the diodes 18 and 19, resistors 9, 12, 13 and 14 and to armature winding 3. When a sensitive, hysteresis-free comparator is used, such as for example a commercially available integrated circuit, then the value of the measuring resistor 9 can be very small. In this case it is possible to regulate the parameters of a universal motor of higher power without the necessity to provide special cooling measures for the measuring resistor 9.

The pulse width modulated regulating signal in conductor 24 can be processed by the control member 25 in different ways. For example the control member can be in the form of an analog converter which averages the values of respective pulses or it can be designed as a digital device, employing for example gating circuits with subsequent counters producing a control signal applied to the controlling element 26.

The regulating function of the device of this invention will now be explained in connection with a working characteristic of the electric motor illustrated in FIG. 3. The bridge circuit is balanced so that the bridge voltage between the points 20 and 21 has a minimum value for a normal load point C of the motor. If the load of the motor represented by the point C moves to the right or to the left, the bridge becomes unbalanced and its voltage is increased. If, due to the displacement of the point C, the bridge voltage is increased, then depending on the direction of the displacement the motor operates either in an idling range A2–B or in the overload range D–E2. In the example of FIG. 2, the idling range is characterized by half waves a whereas the overload range is characterized by the half wave b. In transitting from an idling operational range into an overload operational range the bridge voltage undergoes a phase shift, namely the half wave a upon passing through the load point C is shaped into a wave form b. The main voltage and also the voltage across the armature have a fixed correlation to the bridge voltage. For a positive main half wave there results always a positive bridge half wave and vice versa. Due to the polarity dependent or rectifying branch of the bridge, the comparator receives always half waves of one polarity, in this example positive half waves a and b. By the anti-parallel connection of the diodes 18 and 19 in cooperation with series connected adjustable resistors 13 and 14, both the idling speed range and the overload range of the motor can be easily separated and controlled. Through the anti-parallel connected diodes 18 and 19, always a unidirectional current flows through the corresponding adjustable resistors 13 and 14. In this example the positive half waves a flow through the adjustable resistor 13 and the rectified negative half waves flow through the adjustable resistor 14. Accordingly, both the positive and the rectified negative half waves can be adjusted independently one from the other.

The effect of this adjustment is indicated in the working characteristic of the motor by dash and dot lines. Both the idling speed range A2–B and the overload range D–E2 are adjustable, and both the point A2 of the rotary speed n and the point each E2 pertaining the maximum torque D are adjustable independently from one another.

The same results are obtained by the modified version of the device of the invention illustrated in the circuit diagram of FIG. 4. In this circuit or circuit components similar to those in FIG. 1 are provided with like reference numerals. The branch of the bridge circuit between the field winding 2 and the bridge diagonal point 21 includes a series connection of resistors 36 and 35 which are further connected via branch resistor 12 to the ground. The tapping point between resistors 36 and 35 is connected to end terminals of adjustable resistors 32 and 34. The other end terminals of the latter resistors are connected via oppositely oriented diodes 31 and 33 to collectors of transistors 29 and 30. The emitters of the two transistors are connected to the common ground point. The base of transistor 29 is supplied with control pulses of one polarity for controlling the torque M whereas the base of the other transistor 30 is supplied with control pulses of opposite polarity for controlling rotary speed n of the motor.

The diagonal bridge points 20 and 21 are directly connected to the inputs of a comparator or operational amplifier 27. The switching or cut off level of the switching comparator 27 is adjustable by means of a variable feedback resistor 28. The output signal from the comparator 27 is fed through conductor 24 to the control member 25 whose output is connected to a control input of a current control element 26.

In this embodiment the rectified positive and negative current half waves are directly conducted to the common ground point. This conduction of the positive and negative current path to the ground has the advantage that control level switches, in this case transistors 29 and 30 can be readily employed without additional power supply measures. Direct current separation members therefore are unnecessary. The changes of the working characteristic of FIG. 3 in this example is accomplished by electrical control signals applied to the bases of transistors 29 and 30. In this manner, a remote control of the regulating device and of the motor is easily made possible. The positive half waves a are controlled by adjustable resistor 34 at the transistor 30 whereas the negative half waves b are controlled by adjustable resistor 32 and the transistor 29. The separation of the current paths from one another is achieved by using the two transistors 29 and 30. The diodes 31 and 33 serve merely for preventing the half waves which are not controlled by the active transistor, from flowing through the collector-base path. In principle, the resistor 35 is unnecessary for the functioning of the regulating circuit, it has merely an auxiliary function. Theoretically the half wave currents could flow directly from the bridge point 21 to the ground. Nevertheless, in a balanced bridge the voltage at the point 21 relative to the ground is so small that it could not reach the threshold level of the transistor and the diodes and accordingly no current would flow. The voltage drop across the resistor 35 increases the potential on the latter connection point and the switch over can be made without problems.

The emitters of transistors 29 and 30 need not be connected to the common ground point. The half wave current can be directed to any point in the circuit. For example, the emitters can be connected to the point 37 between the field and armature windings provided that the type of employed transistors requires reverse potential. In the example of FIG. 4, as mentioned before, the cut off or threshold potential of the comparator 27 is adjusted by means of the adjustable feedback resistor 28. A comparator usable for this embodiment is commercially available from Firma Siemens under the designation TBA 221.

FIG. 5 illustrates another modification of the circuit of this invention whereby like component parts are again designated by the same reference numerals. Resistor 44 is connected between the connection point of the field winding 2 and the armature winding 3 and the adjustable arm of a potentiometer 41. The end terminals of the potentiometer are connected to oppositely polarized diodes 38 and 39 connected to the diagonal bridge point 21. Part 42 of the potentiometer 41 is bridged by a parallel connected resistor 401. If desired, the other part 43 of the potentiometer 41 can be bridged by a parallel connected resistor 402. The branch of the bridge circuit constituted by the resistor 12 is connected between the bridge point 21 and the connection point of the measuring resistor 9 with the controlling element 26. The diagonal bridge points 21 and 20 are directly connected to the inputs of the operational amplifier 27 whose switching threshold level similarly as in the preceding example is controlled by a feedback potentiometer 28. The output signal from the comparator 27 is connected via conductor 24 and control member 25 to the control input of the current controlling elements 26. If desired, the bridging resistors 401 and 402 can be replaced by capacitors 403 and 404, as indicated by dashed lines.

Figure 3:
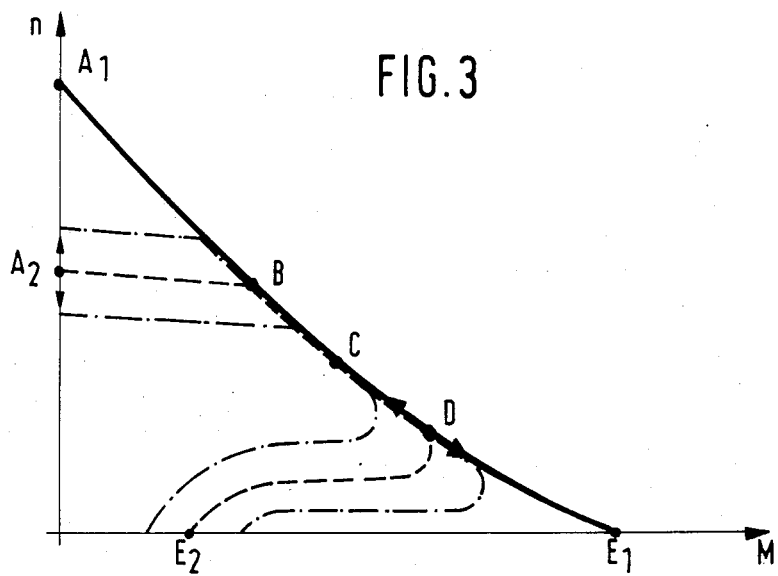
FIG. 3 is a plot diagram of the characteristic curve of an alternating current motor with indication of the effects of the device of this invention.

In the modification of FIG. 5, the potentiometer 41 can adjust both the rotary speed (point A2 in FIG. 3) simultaneously with the maximum torque (point D in FIG. 3). This combined adjustment takes into account that at slow rotary speeds when special cooling measures are insufficient, may become overloaded. The torque limit, by suitably dimensioning the components can be adjusted for avoiding the overload. For instance, in the shown circuit it is possible to combine the drop of rotary speed (A2 is moved down) with a reduced maximum torque (point B is moved toward point C). In other words, the circuit arrangement of FIG. 5 offers the possibility to reverse the dependency of the torque characteristic on the rotary speed characteristic with respect to the corresponding behavior in prior art devices. Accordingly, it is achieved that when the rotary speed is reduced the maximum torque remains either constant or is also reduced.

In this example the reverse relationship of the characteristics is achieved by the diodes 38 and 39 and by the potentiometer 41. The diode 38 is assigned to half waves a pertaining to rotary speed whereas the diode 39 is assigned to half wave b pertaining to the torque. If the potentiometer 41 is rotated to the left then the partial resistance 43 is decreased and the partial resistance 42 is increased. Accordingly, both the half waves a and the half waves b become higher. This is no contradiction inasmuch the driving voltage between the conductor 22 and the point 21 is at an opposite phase with respect to the half waves b. In principle the regulating device of this invention reacts to the broadening of pulses at the output of comparator 27 by reducing the phase angle of the current flowing through the motor. Hence, by setting the potentiometer to the left both the rotary speed and the torque are reduced. While by setting the potentiometer to the right the rotary speed and the torque are increased.

The bridging resistor 401 determines the magnitude of change of the maximum torque D and of the rotary speed A2. This change is maximum when the resistor 401 is moved. On the other hand, if the value of resistor 401 equals 0 that is if the part 42 of the potentiometer is short-circuited then the maximum torque remains constant. If the resistor 402 is replaced by a resistor 401 at the other part 43 of the potentiometer then the rotary speed is dependent on the adjustment of the torque. In particular, when the resistor 402 is short-circuited the rotary speed is constant and only the torque is adjustable.

If the resistor 401 or 402 is replaced by a capacitor 403 or 404 then after switching on the motor for a limited period of time an increased or reduced torque is achieved that means the start of the motor is either accelerated or delayed. This behavior is dependent on the charge of the capacitor. If for example the capacitor 403 has not reached the value of the voltage drop across the partial resistor 42 then the half waves b are reduced in height.

It will be understood that each of the elements described above or two or more together, may also find a useful application in other types of constructions differing from the types described above.

While the invention has been illustrated and described as embodied in specific examples of speed and torque regulating circuits, it is not intended to be limited to the details shown since various modifications and structural changes may be made without departing in any way from the spirit of the present invention.

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for regulating rotary speed and torque of an alternating current electric motor having an armature winding connected as a branch of a bridge circuit balanced for a fixed rotary speed and a fixed operational voltage of the motor, comprising a current adjuster having a control input and being connected for controlling current flowing through said armature winding, another branch of said bridge circuit including polarity dependent resistive means for rectifying voltages generated across said another branch during alternating half-waves of the current; and control means controlled by a voltage generated across a diagonal of said bridge circuit and having an output connected to the control input of said current adjuster to regulate during half-waves of one polarity the rotary speed and during half-waves of opposite polarity the operational voltage of the motor.

2. A device as defined in claim 1, wherein said polarity dependent resistive means includes an anti-parallel connection of two diodes each connected in series with a resistor.

3. A device as defined in claim 2, wherein said resistors in said anti-parallel connection are adjustable.

4. A device as defined in claim 3, wherein said control means includes a switching comparator having inputs connected to a diagonal of said bridge circuit and an output connected to said control input of said current adjuster.

5. A device as defined in claim 4, further comprising a source of threshold voltage connected to one input of said switching comparator to provide a threshold level for cutting off peak values of rectified half waves of one polarity received from the diagonal of said bridge circuit.

6. A device as defined in claim 5, wherein said source of threshold voltage is adjustable.

7. A device as defined in claim 4, wherein said polarity dependent resistive means are connected across two branches of said bridge circuit.

8. A device as defined in claim 7, further comprising a pair of switching elements connected in series with respective series connections of said diodes and resistors in said polarity dependent resistive means.

9. A device as defined in claim 7, wherein said two branches of the bridge circuit which are bridged by said polarity dependent resistive means are formed by resistors.

10. A device as defined in claim 1, wherein said polarity dependent resistive means includes an anti-parallel connection of two diodes interconnected by a potentiometer.

11. A device as defined in claim 10, wherein at least one variable part of the potentiometer is bridged by a fixed resistor.

12. A device as defined in claim 11, comprising a voltage divider connected in said other branch of the bridge circuit and having a tapping point connected to an arm of said potentiometer.

13. A device as defined in claim 10, wherein at least one capacitor is connected parallel to a variable part of said potentiometer.

* * * * *